Patented Feb. 6, 1945

2,368,667

UNITED STATES PATENT OFFICE 2,368,667

PARASITICIDAL PREPARATIONS

Elbert C. Ladd, Passaic, N. J., assignor to United States Rubber Company, New York, N. Y., a corporation of New Jersey No Drawing. Application May 6, 1943,
Serial No. 485,888

5 Claims. (Cl. 167—32)

This invention relates to new and useful improvements in parasiticidal preparations, more particularly to fungicides, and insecticides, the latter term being considered to include larvicides and arachnicides, as well as insectifuges and larvifuges. The invention further relates to methods of protecting organic material subject to attack by microorganisms, as in the immunizing of seed, and the mildewproofing of fabrics and other materials.

I have found that 2,2,3,3-tetrachloro-1,2,3,4-tetrahydronaphthalene-dione-1,4 is an effective fungicide and insecticide. The structure of the compound may be represented as follows:

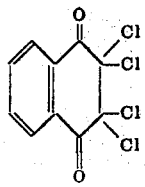

The compound and a method of preparation are described by Zincke and Corksey in "Annalen der Chemie," vol. 255, pages 370–371 (1889). In this article the compound is called "tetrachlor-α-diketohydronaphthalin." Beilstein's "Handbuch der Organischen Chemie," vol. 7, page 702, 4th edition, describes the compound as 2,2,3,3-tetrachlor-1,4-dioxonaphthalin-tetrahydride-(1,2,3,4) or $\beta^1,\beta^1,\beta^2,\beta^2$-tetrachloro - $\alpha^1,\alpha^2$ - diketo - tetrahydronaphthalin.

The 2,2,3,3-tetrachloro-1,2,3,4-tetrahydronaphthalene-dione-1,4 may be used as a seed protectant and to protect plants or soil from organisms harmful to seeds and plants. It may also be applied to prevent or retard fungus growth and the formation of, for example, mildew on rope, wood, fur, hair, feathers, cotton, wool, leather, rubber, rubberized or synthetic resin-coated fabrics, and the like. The 2,2,3,3-tetrachloro-1,2,3,4-tetrahydronaphthalene-dione-1,4 may be applied as dust or sprays or in solution in a suitable solvent. It may be applied diluted or undiluted, or mixed with carrier, or other fungicides or insecticides, fertilizers, hormones, buffering or safening agents.

The following examples are given to illustrate the invention.

Example I

Pea seed, variety Perfection, were tumbled with 1% by weight of the 2,2,3,3-tetrachloro-1,2,3,4-tetrahydronaphthalene-dione-1,4 in dust form. The seeds were then planted in soil known to be infested with a number of organisms, including Pythium ultimum. The effectiveness of the fungicide was determined by comparing the number of treated seeds which germinated and developed into healthy plants with an equal number of untreated seeds planted under the same conditions. Observation made at the end of ten days showed that 98% of the treated seeds had germinated and grown into disease-free seedlings, whereas only 49% of the untreated seed had germinated. The untreated seeds which did not germinate, and the seedings which developed from the untreated seeds, were observed to be infected with Pythium ultimum which had caused seed and seedling rot, whereas those which were treated with 2,2,3,3-tetrachloro-1,2,3,4-tetrahydronaphthalene-dione-1,4 were free of this disease.

Example II

In this case a piece of cotton fabric was dipped into a 1% solution of 2,2,3,3,-tetrachloro-1,2,3,4-tetrahydronaphthalene-dione-1,4 in benzene and then allowed to dry. The fabric sample was then divided into sections. One section was inocculated with Chaetomium globosum spore suspension and incubated on agar medium immediately after treatment and drying; the other was inocculated and incubated in a similar manner after soaking sixteen hours in water and being dried. The sections were incubated for thirty-four days. No growth appeared in either section. In control cotton fabrics which were not treated, and treated only with the solvent, and then inocculated and incubated with the same fungus under the same conditions, a heavy growth of fungus showed within five days.

Example III

The arachnicidal properties of 2,2,3,3-tetrachloro-1, 2, 3, 4-tetrahydronaphthalenedione-1,4 are shown by the following test:

1 part by weight of 2, 2, 3, 3-tetrachloro-1,2,3,4-tetrahydronaphthalenedione-1,4 was suspended in 200 parts of water which contained ½ part of Nacconal (wetting agent). The dispersion was then sprayed on bean plants heavily infested with red spiders. Counts taken 72 hours after spraying showed that 99% of the spiders had been killed. A similar experiment in which the dilution was increased to 1 part of the chemical in 400 parts of water containing .001 part Nacconal gave 96% mortality. Counts taken on control plants infested with spiders which were sprayed with water containing .25% of Nacconal but without the 2,2,3,3-tetrachloro-1,2,3,4-tetrahydronaphthalenedione-1,4 showed less than 10% dead.

*Example IV*

The repellent properties of 2,2,3,3-tetrachloro-1,2,3,4-tetrahydronaphthalene-dione-1,4 are shown by the following tests:

4 pieces of woolen cloth 1½ x 4" were immersed in a 5% solution by weight of the chemical in ether until saturated with the solution, then removed, air-dried to remove the ether and each placed in a separate covered petri dish containing 5 black carpet beetle larvae, and allowed to stand in a dark place at room temperature for three weeks. Four similar pieces of untreated woolen cloth were placed in separate petri dishes, each of which contained five black carpet beetle larvae and then allowed to stand for the same length of time under the same conditions. At the end of this period it was found that no visible feeding had occurred on the treated samples whereas very heavy feeding had occurred on the untreated samples. Furthermore, 70% of the larvae exposed to the treated samples were dead, whereas there was no mortality in the larvae exposed to the untreated samples.

Having thus described my invention, what I claim and desire to protect by Letters Patent is:

1. A fungicidal composition comprising a carrier and 2,2,3,3-tetrachloro-1,2,3,4-tetrahydronaphthalene-dione-1,4 as an essential active ingredient.

2. The method of protecting organic material subject to attack by microorganisms which comprises treating said organic material with 2,2,3,3-tetrachloro - 1,2,3,4 - tetrahydronaphthalene-dione-1,4.

3. The method of protecting seeds, plants and soil subject to attack by fungi and insects which comprises treating said material with 2,2,3,3-tetrachloro - 1,2,3,4 - tetrahydronaphthalene-dione-1,4.

4. The method of immunizing seed which comprises treating said seed with 2,2,3,3-tetrachloro-1,2,3,4-tetrahydronaphthalene-dione-1,4.

5. The method of controlling mildew on organic material which comprises treating said organic material with 2,2,3,3-tetrachloro-1,2,3,4-tetrahydronaphthalene-dione-1,4.

ELBERT C. LADD.